United States Patent
Renfro, Jr.

(10) Patent No.: US 8,248,208 B2
(45) Date of Patent: Aug. 21, 2012

(54) RFID-BASED ACTIVE LABELING SYSTEM FOR TELECOMMUNICATION SYSTEMS

(75) Inventor: James G. Renfro, Jr., Hickory, NC (US)

(73) Assignee: Corning Cable Systems, LLC., Hickory, NC (US)

( * ) Notice: Subject to any disclaimer, the term of this patent is extended or adjusted under 35 U.S.C. 154(b) by 870 days.

(21) Appl. No.: 12/218,371

(22) Filed: Jul. 15, 2008

(65) Prior Publication Data

US 2010/0013600 A1    Jan. 21, 2010

(51) Int. Cl.
*H04Q 5/22* (2006.01)
(52) U.S. Cl. .................................................. 340/10.1
(58) Field of Classification Search ............... 340/572.3, 340/572.1, 10.51, 825; 206/459.5; 427/487; 235/385; 385/135; 345/85
See application file for complete search history.

(56) References Cited

U.S. PATENT DOCUMENTS

| | | |
|---|---|---|
| 3,052,842 A | 9/1962 | Frohman et al. |
| 3,609,742 A | 9/1971 | Burdick |
| 3,771,098 A | 11/1973 | Dempsey |
| 3,931,574 A | 1/1976 | Curtis, Jr. et al. |
| 3,942,859 A | 3/1976 | Korodi |
| 4,019,128 A | 4/1977 | Chebowski |
| 4,200,862 A | 4/1980 | Campbell et al. |
| 4,365,238 A | 12/1982 | Kollin |
| 4,418,333 A | 11/1983 | Schwarzbach et al. |
| 4,578,636 A | 3/1986 | Bakke et al. |
| 4,626,633 A | 12/1986 | Ruehl et al. |
| 4,630,886 A | 12/1986 | Lauriello et al. |
| 4,889,977 A | 12/1989 | Haydon |
| 4,915,639 A | 4/1990 | Cohn et al. |
| 4,924,213 A | 5/1990 | Decho et al. |
| 4,937,529 A | 6/1990 | O'Toole, III et al. |
| 4,968,929 A | 11/1990 | Hauck et al. |
| 4,978,317 A | 12/1990 | Pocrass |
| 5,081,627 A | 1/1992 | Yu |
| 5,185,570 A | 2/1993 | Fitzpatrick |
| 5,199,093 A | 3/1993 | Longhurst |

(Continued)

FOREIGN PATENT DOCUMENTS

DE    19841738    3/2000

(Continued)

OTHER PUBLICATIONS

Wilson, Brian et al., "Multiwavelength Optical Networking Management and Control," Journal of Lightwave Technology, IEEE Dec. 1, 2000, vol. 18, No. 12, pp. 2038-2057.

(Continued)

*Primary Examiner* — Jennifer Mehmood
*Assistant Examiner* — Kaleria Knox
(74) *Attorney, Agent, or Firm* — Joseph M. Homa

(57) ABSTRACT

A radio-frequency identification-(RFID)-based active labeling system for labeling components of a telecommunication system. The active labeling system includes an electronically addressable active label device that forms and displays indicia that remains static and visible when the device is unpowered. A RFID tag is operably connected to the device and is configured to receive a RF signal that contains component information, and to harvest power from the RF signal. The RFID tag then transfers the component information and power to active label device to enable it to form and display indicia representative of the component information. A database unit is operably connected or is contained directly in the RF reader and contains the component information on a computer-readable medium.

29 Claims, 5 Drawing Sheets

U.S. PATENT DOCUMENTS

| | | |
|---|---|---|
| 5,222,164 A | 6/1993 | Bass, Sr. et al. |
| 5,244,409 A | 9/1993 | Guss, III et al. |
| 5,265,187 A | 11/1993 | Morin et al. |
| 5,297,015 A | 3/1994 | Miyazaki et al. |
| 5,305,405 A | 4/1994 | Emmons et al. |
| 5,337,400 A | 8/1994 | Morin et al. |
| 5,353,367 A | 10/1994 | Czosnowski et al. |
| 5,394,503 A * | 2/1995 | Dietz et al. .................... 385/135 |
| 5,418,334 A | 5/1995 | Williams |
| 5,448,675 A | 9/1995 | Leone et al. |
| 5,461,693 A | 10/1995 | Pimpinella |
| 5,473,715 A | 12/1995 | Schofield et al. |
| 5,483,467 A | 1/1996 | Krupka et al. |
| 5,528,222 A | 6/1996 | Moskowitz et al. |
| 5,588,873 A | 12/1996 | Hamai et al. |
| 5,601,451 A | 2/1997 | Driones et al. |
| 5,613,873 A | 3/1997 | Bell, Jr. |
| 5,638,818 A | 6/1997 | Diab et al. |
| 5,645,440 A | 7/1997 | Tobler et al. |
| 5,660,567 A | 8/1997 | Nierlich et al. |
| 5,666,453 A | 9/1997 | Dannenmann |
| 5,685,737 A | 11/1997 | Morin et al. |
| 5,692,925 A | 12/1997 | Bogese, II |
| 5,700,157 A | 12/1997 | Chung |
| 5,704,802 A | 1/1998 | Loudermilk |
| 5,741,152 A | 4/1998 | Boutros |
| 5,764,043 A | 6/1998 | Czosnowski et al. |
| 5,782,757 A | 7/1998 | Diab et al. |
| 5,797,767 A | 8/1998 | Schell |
| 5,821,510 A | 10/1998 | Cohen et al. |
| 5,842,045 A | 11/1998 | Nakamura |
| 5,847,557 A | 12/1998 | Fincher et al. |
| 5,854,824 A | 12/1998 | Bengal et al. |
| 5,876,239 A | 3/1999 | Morin et al. |
| 5,876,240 A | 3/1999 | Derstine et al. |
| 5,885,100 A | 3/1999 | Talend et al. |
| 5,910,776 A | 6/1999 | Black |
| 5,914,862 A | 6/1999 | Ferguson et al. |
| 5,915,993 A | 6/1999 | Belopolsky et al. |
| 5,924,889 A | 7/1999 | Wang |
| 5,934,925 A | 8/1999 | Tobler et al. |
| 5,984,731 A | 11/1999 | Laity |
| 5,995,006 A | 11/1999 | Walsh |
| 5,995,855 A | 11/1999 | Kiani et al. |
| 5,999,400 A | 12/1999 | Belopolsky et al. |
| 6,002,331 A | 12/1999 | Laor |
| 6,025,725 A | 2/2000 | Gershenfeld et al. |
| 6,068,627 A | 5/2000 | Orszulak et al. |
| 6,095,851 A | 8/2000 | Laity et al. |
| 6,095,869 A | 8/2000 | Wang |
| 6,100,804 A | 8/2000 | Brady et al. |
| 6,102,741 A | 8/2000 | Boutros et al. |
| 6,113,422 A | 9/2000 | Somerville et al. |
| 6,116,946 A | 9/2000 | Lewis et al. |
| 6,116,962 A | 9/2000 | Laity |
| 6,118,379 A | 9/2000 | Kodukula et al. |
| 6,120,318 A | 9/2000 | Reed et al. |
| 6,126,610 A | 10/2000 | Rich et al. |
| 6,127,929 A | 10/2000 | Roz |
| 6,133,835 A | 10/2000 | De Leeuw et al. |
| 6,142,822 A | 11/2000 | Wu |
| 6,152,762 A | 11/2000 | Marshall et al. |
| 6,164,551 A | 12/2000 | Altwasser |
| 6,174,194 B1 | 1/2001 | Bleicher et al. |
| 6,217,371 B1 | 4/2001 | Wu |
| 6,222,908 B1 | 4/2001 | Bartolutti et al. |
| 6,222,975 B1 | 4/2001 | Gilbert et al. |
| 6,224,417 B1 | 5/2001 | Belopolsky et al. |
| 6,227,911 B1 | 5/2001 | Boutros et al. |
| 6,232,870 B1 | 5/2001 | Garber et al. |
| 6,234,830 B1 | 5/2001 | Ensz et al. |
| 6,241,550 B1 | 6/2001 | Laity et al. |
| 6,243,654 B1 | 6/2001 | Johnson et al. |
| 6,256,523 B1 | 7/2001 | Diab et al. |
| 6,280,213 B1 | 8/2001 | Tobler et al. |
| 6,285,293 B1 | 9/2001 | German et al. |
| 6,298,255 B1 | 10/2001 | Cordero et al. |
| 6,319,051 B1 | 11/2001 | Chang et al. |
| 6,319,062 B1 | 11/2001 | Ma et al. |
| 6,325,664 B1 | 12/2001 | Someda et al. |
| 6,330,307 B1 | 12/2001 | Bloch et al. |
| 6,349,228 B1 | 2/2002 | Kiani et al. |
| 6,350,148 B1 | 2/2002 | Bartolutti et al. |
| 6,352,446 B2 | 3/2002 | Ezawa et al. |
| 6,354,884 B1 | 3/2002 | Yeh et al. |
| 6,368,155 B1 | 4/2002 | Bassler et al. |
| 6,375,362 B1 | 4/2002 | Heiles et al. |
| 6,377,203 B1 | 4/2002 | Doany |
| 6,378,111 B1 | 4/2002 | Brenner et al. |
| 6,402,743 B1 | 6/2002 | Orszulak et al. |
| 6,409,530 B1 | 6/2002 | Zhao et al. |
| 6,424,263 B1 | 7/2002 | Lee et al. |
| 6,424,315 B1 | 7/2002 | Glenn et al. |
| 6,424,710 B1 | 7/2002 | Bartolutti et al. |
| 6,428,361 B1 | 8/2002 | Imschweiler et al. |
| 6,431,906 B1 | 8/2002 | Belopolsky |
| 6,439,922 B1 | 8/2002 | Laurer et al. |
| 6,456,768 B1 | 9/2002 | Boncek et al. |
| 6,457,993 B1 | 10/2002 | Espenshade |
| 6,464,533 B1 | 10/2002 | Ma et al. |
| 6,469,404 B1 | 10/2002 | Pohjola |
| 6,478,610 B1 | 11/2002 | Zhou et al. |
| 6,478,611 B1 | 11/2002 | Hyland |
| 6,496,113 B2 | 12/2002 | Lee et al. |
| 6,496,382 B1 | 12/2002 | Ferguson et al. |
| 6,499,861 B1 | 12/2002 | German et al. |
| 6,522,308 B1 | 2/2003 | Mathieu |
| 6,522,737 B1 | 2/2003 | Bartolutti et al. |
| 6,541,756 B2 | 4/2003 | Schulz et al. |
| 6,543,940 B2 | 4/2003 | Chu |
| 6,556,761 B1 | 4/2003 | Jennings et al. |
| 6,574,586 B1 | 6/2003 | David et al. |
| 6,577,243 B1 | 6/2003 | Dannenmann et al. |
| 6,580,086 B1 | 6/2003 | Schulz et al. |
| 6,618,022 B2 | 9/2003 | Harvey |
| 6,655,988 B1 | 12/2003 | Simmons et al. |
| 6,663,417 B1 | 12/2003 | Hung |
| 6,684,179 B1 | 1/2004 | David |
| 6,685,701 B2 | 2/2004 | Orszulak et al. |
| 6,688,908 B2 | 2/2004 | Wallace |
| 6,688,910 B1 | 2/2004 | Macauley |
| 6,693,513 B2 | 2/2004 | Tuttle |
| 6,696,952 B2 | 2/2004 | Zirbes |
| 6,725,177 B2 | 4/2004 | David et al. |
| 6,729,910 B2 | 5/2004 | Fuller |
| 6,733,186 B2 | 5/2004 | Pfleger |
| 6,750,643 B2 | 6/2004 | Hwang et al. |
| 6,773,298 B2 | 8/2004 | Gutierrez et al. |
| 6,773,306 B2 | 8/2004 | Plishner |
| 6,784,802 B1 * | 8/2004 | Stanescu ....................... 340/687 |
| 6,798,956 B2 | 9/2004 | Morrison |
| 6,808,116 B1 | 10/2004 | Eslambolchi et al. |
| 6,829,427 B1 | 12/2004 | Becker |
| 6,831,443 B2 | 12/2004 | Liu |
| 6,846,115 B1 | 1/2005 | Shang et al. |
| 6,847,856 B1 | 1/2005 | Bohannon |
| 6,857,897 B2 | 2/2005 | Conn |
| 6,866,424 B2 | 3/2005 | Tanaka et al. |
| 6,871,156 B2 | 3/2005 | Wallace et al. |
| 6,881,096 B2 | 4/2005 | Brown et al. |
| 6,888,996 B2 | 5/2005 | Hwang et al. |
| 6,890,197 B2 | 5/2005 | Liebenow |
| 6,896,542 B2 | 5/2005 | Chang |
| 6,898,368 B2 | 5/2005 | Colombo et al. |
| 6,900,629 B2 | 5/2005 | Hwang et al. |
| 6,902,433 B2 | 6/2005 | Hashimoto et al. |
| 6,910,917 B2 | 6/2005 | Chen |
| 6,913,481 B2 | 7/2005 | Marshall et al. |
| 6,915,050 B2 | 7/2005 | Koyasu et al. |
| 6,917,763 B1 | 7/2005 | Au et al. |
| 6,921,284 B2 | 7/2005 | Sirichai et al. |
| 6,923,689 B2 | 8/2005 | Xue et al. |
| 6,924,781 B1 * | 8/2005 | Gelbman ........................ 345/85 |
| 6,924,997 B2 | 8/2005 | Chen et al. |
| 6,961,675 B2 | 11/2005 | David |
| 6,968,994 B1 | 11/2005 | Ashwood Smith |
| 6,971,895 B2 | 12/2005 | Sago et al. |

| | | |
|---|---|---|
| 6,973,243 B2 | 12/2005 | Koyasu et al. |
| 6,975,242 B2 | 12/2005 | Dannenmann et al. |
| 6,979,223 B2 | 12/2005 | Chen |
| 6,992,567 B2 * | 1/2006 | Cole et al. ............ 340/10.1 |
| 6,999,028 B2 | 2/2006 | Egbert |
| 7,014,100 B2 | 3/2006 | Zierolf |
| 7,014,500 B2 | 3/2006 | Belesimo |
| 7,016,726 B1 | 3/2006 | Picardo et al. |
| 7,018,242 B2 | 3/2006 | Brown et al. |
| 7,024,089 B2 | 4/2006 | Weinert et al. |
| 7,027,704 B2 | 4/2006 | Frohlich et al. |
| 7,028,087 B2 | 4/2006 | Caveney |
| 7,028,202 B2 | 4/2006 | Long et al. |
| 7,038,135 B1 | 5/2006 | Chan et al. |
| 7,044,949 B2 | 5/2006 | Orszulak et al. |
| 7,046,899 B2 | 5/2006 | Colombo et al. |
| 7,062,139 B2 | 6/2006 | Shang |
| 7,068,912 B1 | 6/2006 | Becker |
| 7,069,345 B2 | 6/2006 | Shteyn |
| 7,080,945 B2 | 7/2006 | Colombo et al. |
| 7,081,808 B2 | 7/2006 | Colombo et al. |
| 7,096,077 B2 | 8/2006 | Price et al. |
| 7,102,520 B2 | 9/2006 | Liu et al. |
| 7,123,810 B2 | 10/2006 | Parrish |
| 7,132,641 B2 | 11/2006 | Schulz et al. |
| 7,140,782 B2 | 11/2006 | Frohlich et al. |
| 7,151,455 B2 | 12/2006 | Lindsay et al. |
| 7,158,031 B2 | 1/2007 | Tuttle |
| 7,158,033 B2 | 1/2007 | Forster |
| 7,160,143 B2 | 1/2007 | David et al. |
| 7,165,728 B2 | 1/2007 | Durrant et al. |
| 7,168,975 B2 | 1/2007 | Kuo |
| 7,170,393 B2 | 1/2007 | Martin |
| 7,173,345 B2 | 2/2007 | Brandt et al. |
| 7,193,422 B2 | 3/2007 | Velleca et al. |
| 7,194,180 B2 | 3/2007 | Becker |
| 7,205,898 B2 | 4/2007 | Dixon et al. |
| 7,207,846 B2 | 4/2007 | Caveney et al. |
| 7,210,858 B2 | 5/2007 | Sago et al. |
| 7,217,152 B1 | 5/2007 | Xin et al. |
| 7,221,277 B2 | 5/2007 | Caron et al. |
| 7,221,284 B2 | 5/2007 | Scherer et al. |
| 7,224,278 B2 | 5/2007 | Phaneuf et al. |
| 7,224,280 B2 | 5/2007 | Ferguson et al. |
| 7,226,217 B1 | 6/2007 | Benton et al. |
| 7,233,250 B2 | 6/2007 | Forster |
| 7,234,944 B2 | 6/2007 | Nordin et al. |
| 7,243,837 B2 | 7/2007 | Durrant et al. |
| 7,247,046 B1 | 7/2007 | Wu |
| 7,252,538 B2 | 8/2007 | Garrett et al. |
| 7,253,735 B2 | 8/2007 | Gengel et al. |
| 7,265,674 B2 | 9/2007 | Tuttle |
| 7,275,970 B2 | 10/2007 | Hoshina |
| 7,285,007 B2 | 10/2007 | Barna |
| 7,294,786 B2 | 11/2007 | Aldereguia et al. |
| 7,297,018 B2 | 11/2007 | Caveney et al. |
| 7,297,028 B2 | 11/2007 | Daikuhara et al. |
| 7,298,266 B2 | 11/2007 | Forster |
| 7,298,330 B2 | 11/2007 | Forster |
| 7,298,946 B2 | 11/2007 | Mueller |
| 7,306,489 B2 | 12/2007 | Werthman et al. |
| 7,307,408 B2 | 12/2007 | Porcu et al. |
| 7,318,744 B2 | 1/2008 | Kuo |
| 7,319,397 B2 | 1/2008 | Chung et al. |
| 7,327,278 B2 | 2/2008 | Dannenmann et al. |
| 7,336,883 B2 | 2/2008 | Scholtz |
| 7,349,605 B2 | 3/2008 | Noonan et al. |
| 7,352,285 B2 | 4/2008 | Sakama et al. |
| 7,352,289 B1 | 4/2008 | Harris |
| 7,354,298 B2 | 4/2008 | James |
| 7,356,208 B2 | 4/2008 | Becker |
| 7,411,500 B2 * | 8/2008 | Hamerly et al. ............ 340/572.1 |
| 7,468,669 B1 | 12/2008 | Beck et al. |
| 7,504,945 B2 * | 3/2009 | Cox et al. ............ 340/572.1 |
| 7,757,936 B2 | 7/2010 | Aguren et al. |
| 7,760,094 B1 * | 7/2010 | Kozischek et al. ....... 340/572.1 |
| 7,772,975 B2 | 8/2010 | Downie et al. |
| 7,782,202 B2 | 8/2010 | Downie et al. |
| 2001/0008390 A1 | 7/2001 | Berquist et al. |
| 2001/0027055 A1 | 10/2001 | Laity et al. |
| 2001/0039140 A1 | 11/2001 | Fasold et al. |
| 2002/0071394 A1 | 6/2002 | Koziy et al. |
| 2002/0086584 A1 | 7/2002 | Liu |
| 2002/0090858 A1 | 7/2002 | Caveney |
| 2002/0092347 A1 | 7/2002 | Niekerk et al. |
| 2003/0021580 A1 | 1/2003 | Matthews |
| 2003/0061393 A1 | 3/2003 | Steegmans et al. |
| 2003/0100217 A1 | 5/2003 | Wu |
| 2003/0100218 A1 | 5/2003 | Tsai et al. |
| 2003/0148654 A1 | 8/2003 | Kan |
| 2003/0154273 A1 | 8/2003 | Caveney |
| 2003/0154276 A1 | 8/2003 | Caveney |
| 2003/0162414 A1 | 8/2003 | Schulz et al. |
| 2003/0211782 A1 | 11/2003 | Esparaz et al. |
| 2004/0041714 A1 | 3/2004 | Forster |
| 2004/0052471 A1 | 3/2004 | Colombo et al. |
| 2004/0114879 A1 | 6/2004 | Hiereth et al. |
| 2004/0117515 A1 | 6/2004 | Sago et al. |
| 2004/0123998 A1 | 7/2004 | Berglund et al. |
| 2004/0149736 A1 | 8/2004 | Clothier |
| 2004/0184747 A1 | 9/2004 | Koyasu et al. |
| 2004/0253874 A1 | 12/2004 | Plishner |
| 2005/0032415 A1 | 2/2005 | Sakamoto |
| 2005/0052174 A1 | 3/2005 | Angelo et al. |
| 2005/0052287 A1 | 3/2005 | Whitesmith et al. |
| 2005/0068179 A1 | 3/2005 | Roesner |
| 2005/0076982 A1 | 4/2005 | Metcalf et al. |
| 2005/0093677 A1 | 5/2005 | Forster et al. |
| 2005/0111491 A1 | 5/2005 | Caveney |
| 2005/0215119 A1 | 9/2005 | Kaneko |
| 2005/0224585 A1 | 10/2005 | Durrant et al. |
| 2005/0231325 A1 | 10/2005 | Durrant et al. |
| 2005/0232636 A1 | 10/2005 | Durrant et al. |
| 2005/0259930 A1 | 11/2005 | Elkins, II et al. |
| 2005/0260884 A1 | 11/2005 | Yueh |
| 2005/0280511 A1 | 12/2005 | Yokoyama et al. |
| 2006/0039136 A1 | 2/2006 | Probasco et al. |
| 2006/0042984 A1 * | 3/2006 | Suzuki ............ 206/459.5 |
| 2006/0044148 A1 | 3/2006 | Daniels et al. |
| 2006/0091207 A1 | 5/2006 | Chang |
| 2006/0148279 A1 | 7/2006 | German et al. |
| 2006/0153517 A1 | 7/2006 | Reagan et al. |
| 2006/0166546 A1 | 7/2006 | Ashizawa et al. |
| 2006/0206246 A1 | 9/2006 | Walker |
| 2006/0232419 A1 | 10/2006 | Tomioka et al. |
| 2006/0233506 A1 | 10/2006 | Noonan et al. |
| 2006/0257092 A1 | 11/2006 | Lu et al. |
| 2006/0267778 A1 | 11/2006 | Gengel et al. |
| 2006/0275007 A1 | 12/2006 | Livingston et al. |
| 2006/0282529 A1 | 12/2006 | Nordin |
| 2006/0286856 A1 | 12/2006 | Sakamoto |
| 2006/0292311 A1 * | 12/2006 | Kilburn et al. ............ 427/487 |
| 2007/0013487 A1 | 1/2007 | Scholtz et al. |
| 2007/0015410 A1 | 1/2007 | Siemon et al. |
| 2007/0023525 A1 | 2/2007 | Son et al. |
| 2007/0032124 A1 | 2/2007 | Nordin et al. |
| 2007/0055470 A1 | 3/2007 | Pietrzyk et al. |
| 2007/0059975 A1 | 3/2007 | Walsh |
| 2007/0116411 A1 | 5/2007 | Benton et al. |
| 2007/0117450 A1 | 5/2007 | Truxes |
| 2007/0120684 A1 | 5/2007 | Utaka et al. |
| 2007/0152828 A1 | 7/2007 | Mohalik |
| 2007/0155223 A1 | 7/2007 | Huang et al. |
| 2007/0176745 A1 | 8/2007 | Gibson et al. |
| 2007/0196058 A1 | 8/2007 | Lee et al. |
| 2007/0205897 A1 | 9/2007 | Forster |
| 2007/0216534 A1 | 9/2007 | Ferguson et al. |
| 2007/0236355 A1 | 10/2007 | Flaster et al. |
| 2007/0238343 A1 | 10/2007 | Velleca et al. |
| 2007/0241439 A1 | 10/2007 | Chung et al. |
| 2007/0247284 A1 | 10/2007 | Martin et al. |
| 2008/0003867 A1 | 1/2008 | Wu |
| 2008/0021766 A1 | 1/2008 | McElwaine et al. |
| 2008/0032546 A1 | 2/2008 | Xuan et al. |
| 2008/0045075 A1 | 2/2008 | Caveney et al. |
| 2008/0090451 A1 | 4/2008 | Feldman |
| 2008/0100456 A1 | 5/2008 | Downie et al. |
| 2008/0100467 A1 | 5/2008 | Downie et al. |

| | | | |
|---|---|---|---|
| 2008/0106415 A1 | 5/2008 | Sellew et al. | |
| 2008/0139306 A1 | 6/2008 | Lutnick et al. | |
| 2008/0220721 A1 | 9/2008 | Downie et al. | |
| 2008/0240724 A1 | 10/2008 | Aguren | |
| 2009/0032577 A1 | 2/2009 | Aguren et al. | |
| 2009/0079544 A1 | 3/2009 | Noble | |
| 2009/0096581 A1 | 4/2009 | Macauley et al. | |
| 2009/0224039 A1* | 9/2009 | Hause et al. | 235/385 |
| 2009/0240945 A1 | 9/2009 | Aronson | |
| 2009/0261955 A1 | 10/2009 | Moore et al. | |
| 2010/0080554 A1 | 4/2010 | Aguren | |

FOREIGN PATENT DOCUMENTS

| | | |
|---|---|---|
| DE | 19920452 | 11/2000 |
| DE | 102 44 304 B3 | 3/2004 |
| DE | 10249414 | 5/2004 |
| DE | 10 2006 030 077 A1 | 1/2008 |
| EP | 1455550 A2 | 9/2004 |
| EP | 1 696 680 B1 | 4/2008 |
| GB | 2 347 508 A | 9/2000 |
| GB | 2371211 A | 7/2002 |
| JP | 03-242795 | 10/1991 |
| JP | 04-039483 | 2/1992 |
| JP | 04-174406 | 6/1992 |
| JP | 8191257 A | 7/1996 |
| JP | 2001069625 A | 3/2001 |
| JP | 2001-099946 | 4/2001 |
| JP | 2002-264617 | 9/2002 |
| JP | 2003-148653 | 5/2003 |
| JP | 2003-172827 | 6/2003 |
| JP | 2003-229215 | 8/2003 |
| JP | 2003284213 A | 10/2003 |
| JP | 2004-039389 | 2/2004 |
| JP | 2004038583 A | 2/2004 |
| JP | 2004-142500 | 5/2004 |
| JP | 2004-152543 | 5/2004 |
| JP | 2004-245963 | 9/2004 |
| JP | 2004-247090 | 9/2004 |
| JP | 2004-247134 | 9/2004 |
| JP | 2004-264901 | 9/2004 |
| JP | 2004-265624 | 9/2004 |
| JP | 2004-265860 | 9/2004 |
| JP | 2004-265861 | 9/2004 |
| JP | 2004-266886 | 9/2004 |
| JP | 2004-317737 | 11/2004 |
| JP | 2004-349184 | 12/2004 |
| JP | 2004361896 A | 12/2004 |
| JP | 2005-018175 | 1/2005 |
| JP | 2005-033857 | 2/2005 |
| JP | 2005-050581 | 2/2005 |
| JP | 2005-084162 | 3/2005 |
| JP | 2005-086901 | 3/2005 |
| JP | 2005-087135 | 4/2005 |
| JP | 2005-092107 | 4/2005 |
| JP | 2005-134125 | 5/2005 |
| JP | 2005-216698 | 8/2005 |
| JP | 2005234620 A | 9/2005 |
| JP | 2005-302403 | 10/2005 |
| JP | 2005-315980 | 11/2005 |
| JP | 2005-339983 | 12/2005 |
| JP | 2005341738 A | 12/2005 |
| JP | 2006-054118 | 2/2006 |
| JP | 2006101630 A | 4/2006 |
| JP | 2006-245983 | 9/2006 |
| JP | 2006-279650 | 10/2006 |
| JP | 2007-087849 | 4/2007 |
| JP | 2007-088957 | 4/2007 |
| JP | 2007-158993 | 6/2007 |
| JP | 2007-189774 | 7/2007 |
| JP | 2007-221400 | 8/2007 |
| WO | WO 03098175 A1 | 11/2003 |
| WO | WO 2004030154 A2 | 4/2004 |
| WO | WO 2004061511 A2 | 7/2004 |
| WO | WO 2005069203 A2 | 7/2005 |
| WO | 2006/063023 A1 | 6/2006 |
| WO | WO 2008000656 A1 | 1/2008 |
| WO | 2008/075123 A1 | 6/2008 |
| WO | 2008076235 A1 | 6/2008 |

OTHER PUBLICATIONS

Japanese Office Action for patent application 2009-541316 mailed Jan. 10, 2012, 10 pages.

Examination Report for European patent application 09740228.3-2415 mailed Mar. 13, 2012, 12 pages.

* cited by examiner

RFID-BASED ACTIVE LABELING SYSTEM FOR TELECOMMUNICATION SYSTEMS

TECHNICAL FIELD

The present invention relates generally to telecommunications systems such as used to form telecommunications networks, and in particular relates to the active labeling of components of such systems using radio-frequency identification (RFID).

BACKGROUND

Fiber optic telecommunication systems in the form of both public and private networks are used to provide high-bandwidth voice, data, and video services to businesses and homes. As the number of fiber optic cables employed in private and public network communication systems increases, managing the large number of interconnections in the central office and in the field becomes increasingly complex. For example, in the central office of a telecommunications network, there may be hundreds or thousands of fiber connections, depending on the size of the network. The connections are made with the ports of telecommunications equipment stored in a number of equipment racks and cabinets.

A patch panel module is one type of telecommunications equipment that has a number of ports used to connect to fiber optic cables called "jumpers." The patch panel ports themselves are connected to one or more optical fibers ("cable fibers") carried by fiber optic cables that distribute the cable fibers to various locations. These locations are likely to include another set of telecommunications equipment to which the cable fibers are connected.

The task of telecommunication network management includes keeping track of and otherwise recording the various components and connections such as the aforementioned patch-panel connections. The task further includes timely recording changes to the connections so that the network status and configuration is accurately known at any given time. One practical aspect of the network management task involves labeling the various ports, fiber cables and other system components so that service and maintenance personnel know how the network is configured and know the network status at a given time.

The conventional way of carrying out the needed labeling activity involves using handwritten or printed tags or labels. More recently, network management computer software is used to link a connectivity database directly to a label printer so that the information printed on the labels is also recorded in a database. However, this still requires the technician to enter the data, print it out, and then manually affix the labels to each of the relevant system components. Given that a telecommunications cabinet can include hundreds or thousands of different ports, this process is labor-intensive and can take hours or even days to perform.

SUMMARY

A first aspect of the invention is an active labeling system for labeling at least one component of a telecommunication system. The system includes at least one electrically addressable active label device having a display driver operably connected to a display medium. In an example embodiment, the display medium comprises either an electrophoretic display or a cholesteric liquid crystal display. The active label device is configured to form on the display medium indicia that remain static and visible when the device is unpowered. The display medium is disposed on one of the least one telecommunication system component. A radio-frequency identification (RFID) tag having an integrated circuit (IC) chip and an antenna system is disposed on or adjacent the active label device, with the IC chip electrically connected to the device display driver. A RFID reader is adapted to communicate with the RFID tag via RF reader signals that contain information about the at least one telecommunication system component ("component information"). The component information is provided to the display driver via the RFID tag to form on the display medium one or more of the indicia that is/are representative of the component information.

A second aspect of the invention is a method of labeling at least one telecommunication component of a telecommunication system. The method includes providing at least one electrically addressable active label device having a display driver operably connected to a display medium. The active label device is configured to form on the display medium indicia that remain static and visible when the device is unpowered. The method also includes disposing the display medium on one of the least one telecommunication system component. The method further includes operably coupling a RFID tag to the active label device and providing a RF signal to the RFID tag, the RF signal containing information about the at least one telecommunication system component ("component information"). The method also includes receiving the RF signal at the RFID tag and transferring the component information to the active label device, and forming on the display medium indicia representative of the component information. The method includes powering the active label device with one or more of an external power supply, an energy storage unit within the active label device, and an energy storage unit in the RFID tag.

A third aspect of the invention is RFID-based active labeling system for labeling at least one telecommunication component of a telecommunication system. The system includes at least one display device having either an electrophoretic-based or a cholesteric-based display medium arranged on at least one of the at least one telecommunication component. The display medium is configured to display one or more indicia that remain static and visible when no power is provided to the display device. A RF reader is adapted to send RF reader signals containing information about the at least one telecommunication component ("component information"). The system includes a RFID tag operably connected to the display device and configured to receive the RF reader signals and the component information therein and to provide the component information to the display device. The display device forms and displays the one or more indicia on the display medium based on the component information. The active label device is powered by one or more of an external power supply, an energy storage unit within the active label device, and an energy storage unit in the RFID tag.

Additional features and advantages of the invention will be set forth in the detailed description that follows, and in part will be readily apparent to those skilled in the art from that description or recognized by practicing the invention as described herein, including the detailed description that follows, the claims, as well as the appended drawings. It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

DETAILED DESCRIPTION

The active system and labeling methods of the present invention are described in connection with telecommunication systems and the various components that make up the system. Such telecommunication systems include components in the form of various types of network equipment, including the associated optical and electrical links in a data center application. Accordingly, the term "component" as used herein is intended to be widely construed to include, for example, equipment, devices, tools, apparatus, connectors, structures, elements, constituents, ports, cables, cable sections, connectors, modules, parts, units, machinery, gears, jacks, outlets, plugs, racks, frames, shelves, cabinets, wires, wire cables, fibers, fiber cables, and generally the universe of all contemplatable items that make up a telecommunication system and that play a role in determining the system configuration, and that would benefit from being actively labeled. Here, "active labeling" and like terms refer to the ability to automatically and selectively change the visible information (i.e., the indicia) on the label without manually writing over an existing label (e.g., with a pen or marker), or printing a new label and manually affixing it to the component (e.g., over an existing label).

In example embodiments, certain components of the system need not be actively labeled. What constitutes a component that needs to be considered when performing active labeling will depend on the nature of the component and its role in the system. For example, in the discussion below, a telecommunication system rack may, in certain cases, be considered a "component" because it supports an equipment rack and may be worth identifying as a specific rack amongst a host of such racks in a central office. Such racks may hold different components at different times and so may need to be labeled accordingly. On the other hand, a rack may not be considered a relevant component by the end user as compared to other components, such as jumper cables, when for example there is only one rack in a closet and the rack has a fixed use.

The components in the description below are referred to generally by reference number 16, and in specific instances using the reference number 16-X, where the suffix "X" denotes the particular type of component (e.g., X="EU" for "electronics unit," "J" for "jumper," "C" for "cable," etc.)

Active Labeling System

Figure 1:
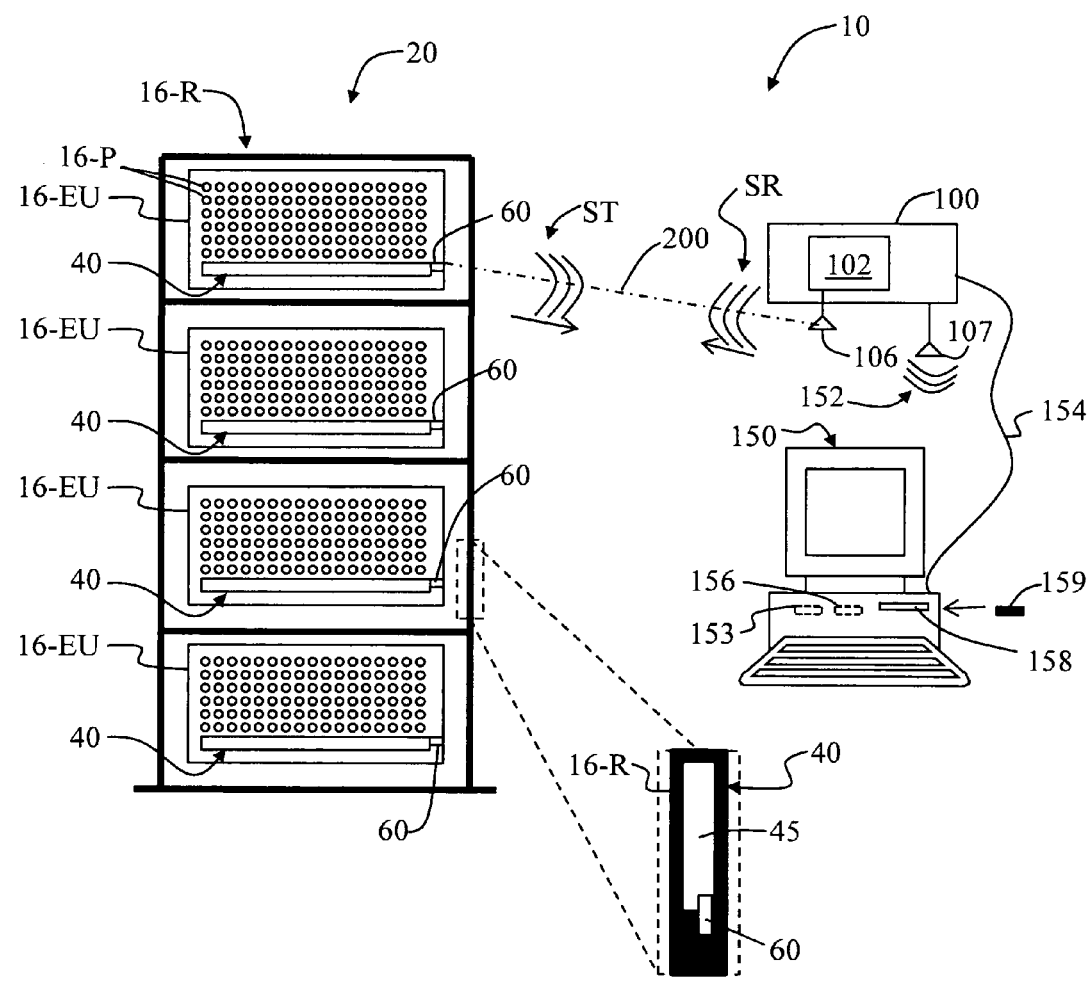
FIG. 1 is a schematic diagram of a RFID-based active labeling system according to the present invention as integrated with components of a telecommunication system.
Figure 2:
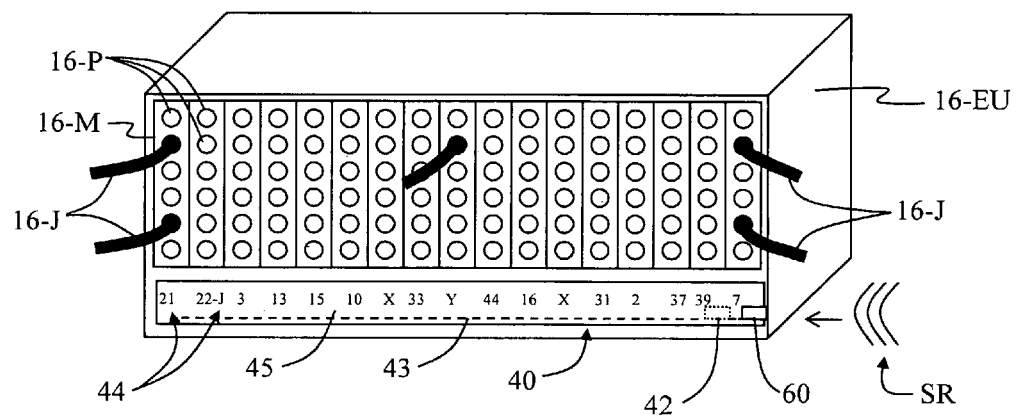
FIG. 2 is a close-up view of an example component of FIG. 1 in the form of an electronics unit that includes a number of components (sub-components) in the form of connection ports, and also showing components in the form of jumper fiber-optic cables ("jumpers") connected to some of the connection ports.

FIG. 1 is a schematic diagram of an example embodiment of an active labeling system 10 according to the present invention as integrated with components 16 of a telecommunication system 20. Components 16 are shown in the form of rack-mounted electronics units 16-EU supported by a rack 16-R. FIG. 2 is a close-up view of an example electronics unit 16-EU (e.g., an electronics shelf) of FIG. 1 that includes a number of components (which can be considered "sub-components") in the form of connection ports 16-P. Components 16 in the form of jumper fiber-optic cables ("jumpers") 16-J are shown connected to some of connection ports 16-P. In an example embodiment, electronics unit 16-EU is a patch panel shelf assembly, and ports 16-P are ports of patch panel modules 16-M supported by the shelf assembly.

Active labeling system 10 includes at least one active label device 40, and in an example embodiment includes multiple active label devices. One active label device 40 is shown affixed to an electronics unit 16-EU while another is shown affixed to rack 16-R (see FIG. 1 inset). Active label device 40 is electrically addressable and includes a display driver 42 operably connected to a display medium 45, such as an electrically addressable screen. Active label device 40 includes electrical circuitry 43 operably connected to display driver 42 and configured to provide the electrical addressability of display medium 45 to form one or more indicia 44 (e.g., alpha, numeric, and alpha-numeric characters, symbols, etc.) at one or more locations (and preferably one or more select locations) that preferably correspond to one or more locations of corresponding one or more components 16.

Indicia 44 serve as labels that communicate information about the component 16 and/or any sub-components therein or thereon. Such information (referred to hereinafter as "component information") includes, for example, make, model/serial number, connection information (such as connection status, connection purpose, physical connection data, etc.), maintenance information (e.g., last maintenance, next scheduled maintenance, nature of any repairs made or to be made, etc.), and the like. Thus, indicia 44 are formed and displayed to be representative of the component information for the associated component or components 16. Preferably, an individual indicium 44 pertaining to a particular component 16 is displayed as close as possible to the particular component.

An active label device 40 according to one embodiment is one that does not require constant or even period applications of electrical power to maintain indicia 44. That is to say, indicia 44 remain static and visible on display medium 45 even when active label device 40 is unpowered (i.e., no power is provided to the display medium). According to this embodiment, the active label device 40 is one that replicates or is otherwise similar to hand-generated or machine-generated static labels, but that can be actively and remotely changed using a minimum of power applied only when a change in the indicia is required.

In this regard, in an example embodiment, display medium 45 comprises either an electrophoretic display or cholesteric liquid-crystal display (LCD). An example electrostatically addressable electrophoretic display is available from E-Ink Corporation, Cambridge, Mass. Examples of such displays are described in the following U.S. Patents, which are all incorporated by reference herein: U.S. Pat. Nos. 7,206,119; 7,148,128; 6,710,540; 6,121,857; 6,120,588; and 5,745,094.

Electrophoretic displays use electronic ink micro-capsules that are responsive to an electric field. The microcapsules are suspended in a liquid carrier medium. The ink (i.e., the carrier medium and the capsules) is deposited on to a sheet of plastic, which is then laminated to a layer of electrical circuitry 43 that includes electrodes, thereby forming the display medium 45. The circuitry is configured to cause the microcapsules to move in an ordered way to form a pattern of pixels on display medium 45 as determined by display driver 42, thereby forming indicia 44.

An important property of electrophoretic displays is that the microcapsules remain in place when electrical circuitry 43 does not carry current. Thus, the only time power is required is to change indicia 44. Otherwise, indicia 44 remain static and visible. In this sense, an electrophoretic display is akin to "electronic paper," and such displays are often called "electronic paper displays."

Cholesteric LCDs can be made flexible by using plastic instead of glass substrates to contain the liquid crystals. An example embodiment of a suitable cholesteric LCD for use as active label device 40 is described in the paper by Schneider et al, "New developments in flexible cholesteric liquid crystal displays," in *Emerging Liquid Crystal Technologies II*, edited by Liang-Chy Chien, Proc. of SPIE, Vol. 6487, 6487OJ (2007), which article is incorporated by reference herein. Suitable cholesteric LCDs for use as display medium 45 in active label device 40 can be obtained from Kent Displays, Inc., Kent, Ohio.

Figure 3A:
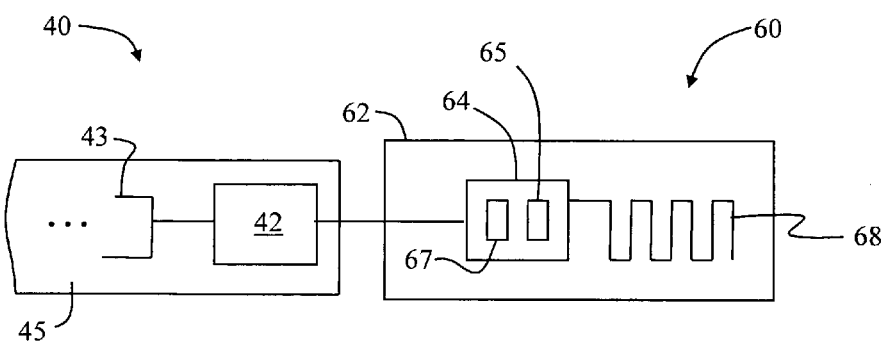
FIG. 3A is a schematic diagram of a RFID tag suitable for use in the active labeling system of the present invention, and showing the connection of the RFID tag to the display driver of the active label device.

Active labeling system 10 of the present invention utilizes RFID technology to provide remote active labeling capability and to facilitate the labeling process. Thus, with continuing reference to FIG. 1 and FIG. 2, active labeling system 10 includes a RFID tag 60 (also called an "RFID transponder") arranged on or adjacent to active label device 40. FIG. 3A is a close-up view of an example RFID tag 60 suitable for use in the present invention and shown as connected to active label device 40. RFID tag 60 includes a substrate 62 that supports an integrated circuit (IC) chip 64 operably connected to an antenna system 68. IC chip 64 is adapted to store information, including component information, (e.g., in a memory unit 65) and to modulate and demodulate RF signals in order to encode and decode signals to extract the component information. In an example embodiment, IC chip 64 includes or is otherwise operably connected to an energy storage unit 67 that stores electrical energy for use by the IC chip and optionally for use by active label device 40, as described below. Typical RF frequencies used in RFID-based systems are 900 MHz and 2.4 MHz.

An exemplary basic RFID tag 60 is described in U.S. Pat. No. 3,713,148, which patent is incorporated by reference herein. RFID tags 60 suitable for use in the present invention are available, for example, from Alien Technology Corporation, Morgan Hill, Calif.

Figure 3B:
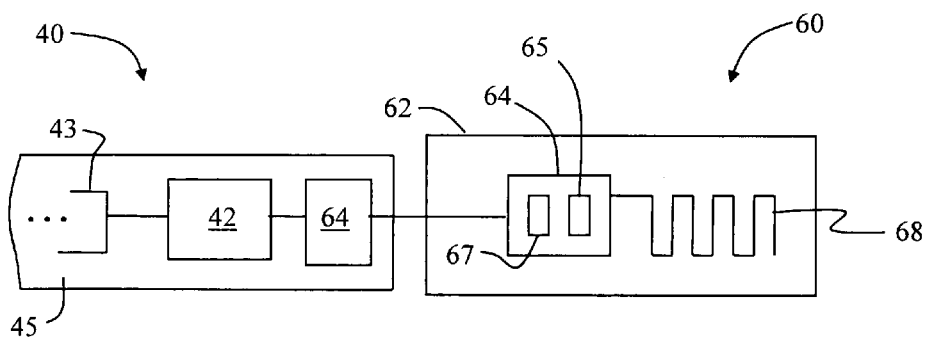
FIG. 3B is similar to FIG. 3A, and illustrates an example embodiment wherein the active label device includes an integrated circuit (IC) chip.

IC chip 64 of RFID tag 60 is operably connected to display driver 42 of active label device 40, as shown schematically in FIG. 3A. FIG. 3B illustrates an example embodiment of RFID tag 60 and active label device 40 wherein another "external" IC chip 64 is included in the active label device and is connected to display driver 42. In an example embodiment, external IC chip 64 is the actual RFID chip 64, i.e., there is only one IC chip 64 and that IC chip resides outside of substrate 62 (hence the term "external") and is connected to RFID antenna system 68. Electrical circuitry 43 used to carry current from display driver 42 to drive display medium 45 and form indicia 44 as described above is shown in FIG. 3A and FIG. 3B. External IC chip 64 can be used, for example, to store component information used to form indicia 44 as communicated to it via RFID tag 60.

Figure 3C:
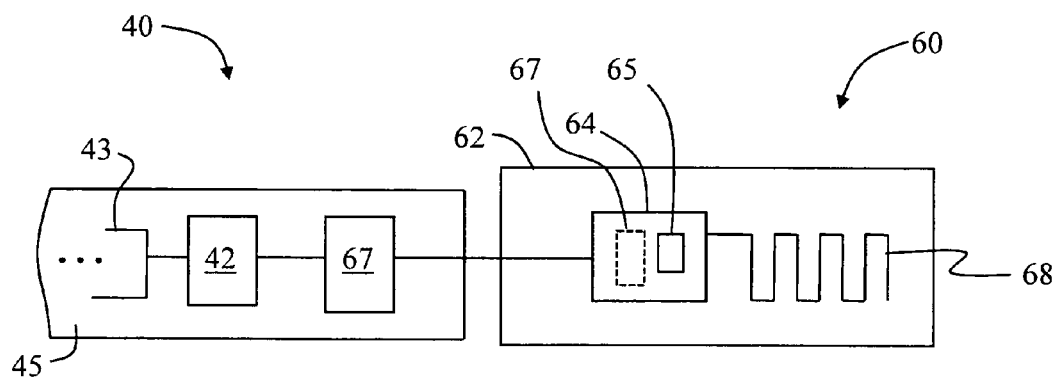
FIG. 3C is similar to FIG. 3A and illustrates an example embodiment wherein the active label device includes an energy storage unit operably connected to the display driver.

FIG. 3C is a schematic diagram similar to FIG. 3A and illustrates an example embodiment wherein an energy storage unit 67 is included in or is otherwise supported by active label device 40 and is operably connected to display driver 42 and to RFID chip 64. Note that an energy storage unit 67 may also be present in or otherwise connected to IC chip 64 as illustrated in phantom. In such an example embodiment, IC chip 64 is configured so that one or both energy storage units 67 are used to power display driver 42.

Figure 3D:
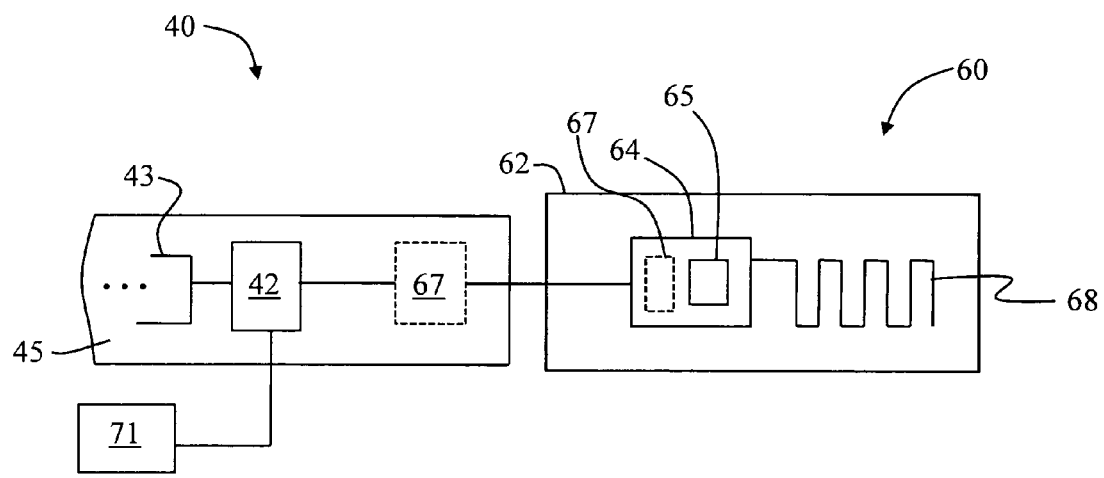
FIG. 3D is a schematic diagram similar to FIG. 3A and illustrates an example embodiment wherein display driver is operably connected to an external power supply, and also showing optional energy supply units in the active label device and the RFID tag.

FIG. 3D is a schematic diagram similar to FIG. 3A and illustrates an example embodiment wherein display driver 42 is powered externally by an external power supply 71, e.g., that is used by component 16 on which active label device 40 resides. For example, where component 16 is an equipment rack, power supply 71 can be the same power supply that powers the equipment in the equipment rack. Note that in an example embodiment, energy storage units 67 (shown in phantom) may also be present in RFID tag 60 and active label device 40. In an example embodiment, active label device 40 is configured to be powered with one or more of external power supply 71, energy storage unit 67 within the active label device, and the energy storage unit of RFID tag 60.

With reference again to FIG. 1, active labeling system 10 further includes a RFID-tag reader ("RFID reader") 100 that includes signal generation/processing electronics ("reader electronics") 102 operably connected to an antenna system ("reader antenna") 106. RFID reader 100 is adapted to generate a radio-frequency (RF) reader signal SR designed to activate or otherwise interrogate RFID tag 60 and to receive a RF tag signal ST from the RFID tag. In an example embodiment, RF reader signal SR also serves to power RFID tag 60, and some or all of the power can be stored in energy storage unit 67 within IC chip 64, while some or all of the power can be passed along to display driver 42 to drive active label device 40. Some or all of the power can also be stored in energy storage unit 67 in active label device 40 (see FIGS. 3C, 3D). RF reader signal SR also provides information to IC chip 64, which information can be stored in memory unit 43 and/or passed along to display driver 42.

In an example embodiment, the information in RF reader signal SR includes the aforementioned component information for one or more components 16 associated with active label device 40 so that indicia 44 can be set to provide labels to at least one, and preferably a plurality of select components. In an example embodiment, RFID reader 100 is a hand-held device to facilitate the active labeling process.

With continuing reference to FIG. 1, in an example embodiment, active labeling system 10 includes a database unit 150 operably connected to RFID reader 100, e.g., via a wireless connection 152 (via a RFID reader antenna 107 and a database wireless card 153 in the database unit) or a non-wireless connection 154, such as an optical fiber or wire-based connection. In an example embodiment, database unit 150 is incorporated directly into RFID reader 100.

An example embodiment of database unit 150 includes a memory unit 156 adapted to store the aforementioned component information, such as information that correlates a particular plug with a particular socket or port, to a particular fiber optic cable assembly with one or more connectors, to other portions of a component (such as correlating a first connector of a fiber optic cable to a second connector, or grouping multiple adapters of a patch panel, etc.), to past and/or current mating components, and any other parameter, connection, association, or other information that a technician may want to know or record when working with and/or monitoring the one or more components 16 in telecommunications system 20. In an example embodiment, database unit 150 includes a drive or port 158 adapted to receive a computer-readable medium 159, such as a floppy disk or "memory stick," that includes component information stored therein.

In the operation of active labeling system 10, RFID reader 100 and RFID tag 60 communicate via tag and reader signals ST and SR over a RF communication path 200 when the two are within reading distance of each other. The reading distance is determined based on a number of factors, including the relative strengths of the various signals from the RFID reader and the RFID tag, as well their relative antenna strengths and the frequency of the signals used. A system operator (not shown) activates RFID reader 100 to transmit RF reader signal SR to RFID tag 60 associated with an active label device 40 that in turn is associated with at least one component 16. RF reader signal SR contains the above-described component information for forming indicia 44. In an example embodiment, the information in RF reader signal SR provided by RFID reader 100 originates in memory unit 156 of database unit 150 and is communicated to the RFID reader via wireless or non-wireless connections 152 or 154.

In an example embodiment, RFID tag 60 receives RF reader signal SR via its antenna system 68 and harvests the electrical power in the received signal (e.g., using energy storage unit 67 in IC chip 64). A sufficient amount of this power is passed along to display driver 42 of active label device 40 to power the device and enable the device to change one or more indicia 44 based on the information provided by RFID reader 100. In another example embodiments such as illustrated in FIG. 3D, display driver 42 receives the information from RFID reader via RFID tag 60 but receives the necessary power to change one or more indicia 44 on active label device 40 from one or more of external power supply 71, energy storage unit 67 within active label device 40, and energy storage unit 67 in IC chip 64.

Figure 4:
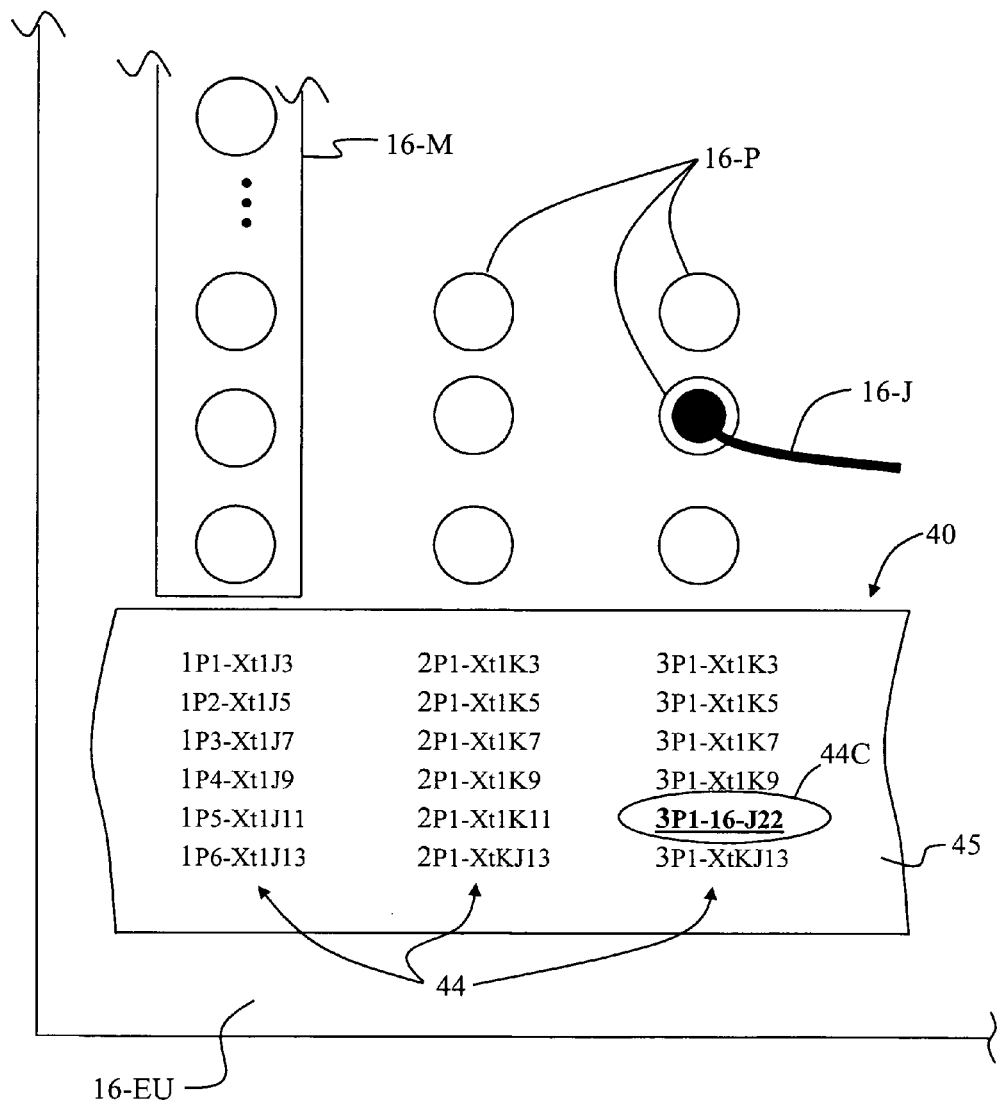
FIG. 4 is a close-up view of a section of the active label device as attached to electronics unit component of FIG. 2, illustrating an example embodiment of detailed indicia that communicate information regarding the component ports of the electronics unit ("component information")

FIG. 4 is a close-up view of a section of active label device 40 as attached to electronics unit component 16-EU such as shown in FIG. 2. Indicia 44 are presented for corresponding ports 16-P, wherein the ports are arranged in columns of six. Information about the identity of the particular port 16-P and its associated connector is presented, including in underlined and bold the one connection of jumper component 16-J shown in the third column (see circled indicia 44C)

Figure 5A:
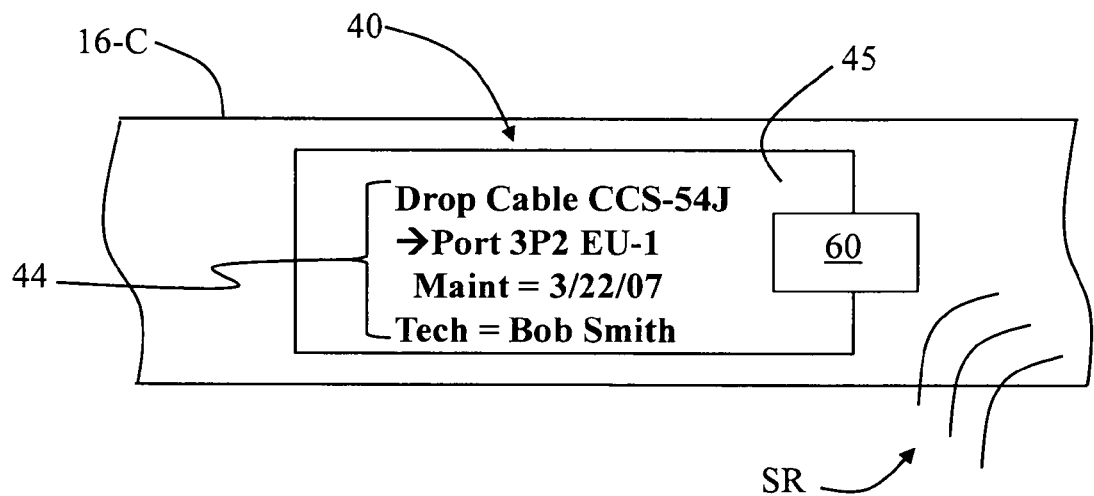
FIG. 5A is a close-up schematic diagram that illustrates an example embodiment of the active labeling system of the present invention, wherein the active label device is affixed to a fiber optic cable component such as a jumper.
Figure 5B:
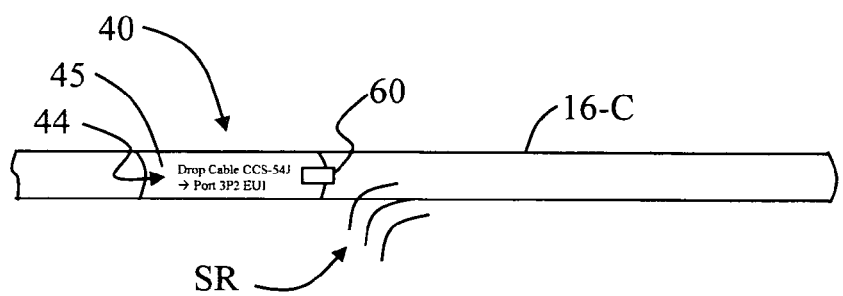
FIG. 5B is a more distant view of the embodiment shown in FIG. 5A, showing how the active label device wraps around the fiber optic cable component.

FIG. 5A is a close-up schematic diagram that illustrates an example embodiment of active labeling system 10 of the present invention wherein active label device 40 is affixed to a fiber optic cable component 16-C. Indicia 44 of active label device 40 includes information about the type of cable ("drop cable"), the cable manufacturer ("CCS" for "Corning Cable Systems"), the port to which the cable is connected or to be connected (Port P2 in row 3 of electronics unit EU-1), the last maintenance date (Mar. 22, 2007), and the technician that performed the maintenance (Bob Smith). FIG. 5B is a more distant view of cable component 16-J of FIG. 5A, showing active label device 40 as being flexible and wrapped around fiber optic cable component 16-C.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An active labeling system for labeling at least one component of a telecommunication system, comprising:
    at least one electrically addressable active label device having a display driver operably connected to a display medium, the active label device configured to form on the display medium indicia that remain static and visible when the active label device is unpowered, and wherein the display medium is disposed on one of the at least one telecommunication system component;
    a radio-frequency identification (RFID) tag having an integrated circuit (IC) chip and an antenna system and disposed on or adjacent the active label device, with the IC chip electrically connected to the device display driver; and
    a RFID reader adapted to communicate with the RFID tag via RF reader signals that contain information about the at least one telecommunication system component ("component information"),
    wherein the component information is provided to the display driver via the RFID tag to form on the display medium one or more of the indicia that is/are representative of the component information; and wherein
    the at least one component includes a patch panel shelf assembly that supports a plurality of patch panel modules supported by the shelf assembly;
    the patch panel modules includes a plurality of ports; and
    the display medium is arranged on the shelf assembly and displays the one or more indicia representative of component information relating to the plurality of ports.

2. The active labeling system of claim 1, wherein the RFID tag is configured to receive power from the RF reader signals and to provide electrical power to the active label device.

3. The active labeling system of claim 1, wherein the display medium comprises an electrophoretic display or a cholesteric liquid crystal display.

4. The active labeling system of claim 1, wherein a second one of the at least one telecommunication system component includes a fiber optic cable, and a second display medium is affixed to the cable.

5. The active labeling system of claim 1, wherein a second one of the at least one telecommunication system component includes an electronics unit that includes a plurality of ports, wherein a second display medium is affixed to the electronics unit, and wherein the component information includes information about the electronics unit and the plurality of ports.

6. The active labeling system of claim 1, wherein the RFID tag IC chip includes a first energy storage unit adapted to store electrical energy from the RF reader signal.

7. The active labeling system of claim 6, wherein the active labeling system includes a second energy storage unit connected to the display driver and to the RFID tag IC chip.

8. The active labeling system of claim 1, wherein the active labeling system includes an energy storage unit connected to the display driver and to the RFID tag IC chip.

9. The active labeling system of claim 1, wherein the display driver is operably connected to a power supply external to the active label device.

10. The active labeling system of claim 1, wherein the display driver is operably connected to and powered by at least one of:
a first energy storage unit within the RFID tag;
a second energy storage unit within the active label device; and
a power supply external to the active label device.

11. The active labeling system of claim 1, further including a second IC chip arranged within the active label device and operably connected to the RFID tag and the display driver, wherein the IC chip is adapted to store the component information for forming the one or more indicia.

12. The active labeling system of claim 1, wherein the at least one telecommunication system component includes an equipment rack that supports a plurality of other telecommunication equipment components, and wherein the display medium is disposed on the equipment rack.

13. The active labeling system of claim 1, further including a database unit operably connected to the RF reader and adapted to store the component information.

14. The active labeling system of claim 1, wherein the RF reader is configured to be hand-held.

15. A method of labeling at least one telecommunication component of a telecommunication system, comprising:
providing at least one electrically addressable active label device having a display driver operably connected to a display medium, the active label device configured to form on the display medium indicia that remain static and visible when the device is unpowered;
disposing the display medium on one of the at least one telecommunication system component wherein the at least one component includes a patch panel shelf assembly that supports a plurality of patch panel modules supported by the shelf assembly, the patch panel modules includes a plurality of ports, and the display medium is arranged on the shelf assembly and displays the one or more indicia representative of component information relating to the plurality of ports;
operably coupling a RFID tag to the active label device;
providing a RF signal to the RFID tag, the RF signal containing information about the at least one telecommunication system component ("component information");
receiving the RF signal at the RFID tag and transferring the component information to the active label device; and
forming on the display medium indicia representative of the component information.

16. The method of claim 15, further including providing electrical power from the RFID tag to the display driver.

17. The method of claim 16, further including providing power to the RFID tag via the RF signal.

18. The method of claim 15, further including providing electrical power to the display driver from one of:
a first energy storage unit within the RFID tag;
a second energy storage unit within the active label device; and
a power supply external to the active label device.

19. The method of claim 15, wherein the display medium comprises an electrophoretic display or a cholesteric liquid crystal display.

20. The method of claim 15, wherein a second of the at least one telecommunication system component includes a fiber optic cable, and including affixing a second display medium to the cable.

21. The method of claim 15, wherein the RFID tag includes an energy storage unit, and including storing electrical energy from a RF reader signal in an electrical storage unit.

22. A radio-frequency identification (RFID)-based active labeling system for labeling at least one telecommunication component of a telecommunication system, comprising:
at least one display device having an electrophoretic-based or a cholesteric-based display medium arranged on at least one of the at least one telecommunication component, the display medium configured to display one or more indicia that remain static and visible when no power is provided to the display device;
a RF reader adapted to send RF reader signals containing information about the at least one telecommunication component ("component information");
a RFID tag operably connected to the display device and configured to receive the RF reader signals and the component information therein and to provide the component information to the display device; and
wherein the display device forms and displays the one or more indicia on the display medium based on the component information; and wherein
the at least one component includes a patch panel shelf assembly that supports a plurality of patch panel modules supported by the shelf assembly;
the patch panel modules includes a plurality of ports; and
the display medium is arranged on the shelf assembly and displays the one or more indicia representative of component information relating to the plurality of ports.

23. The system of claim 22, further including a database unit operably connected to the RF reader and adapted to store the component information.

24. The system of claim 22, wherein the RFID tag includes an IC chip, the at least one display device includes a display driver operably connected to the display medium, and wherein the RFID IC chip is electrically connected to the display driver and is adapted to store the component information for forming the one or more indicia and provide the component information to the display driver.

25. The system of claim 24, wherein the IC chip is configured to extract power from the RF reader signals and to transfer at least some of the extracted power to the display driver.

26. The system of claim 22, wherein the display driver is operably connected to an external power supply.

27. The system of claim 22, further including a database unit operably connected to or included in the RF reader and adapted to store the component information on a computer-readable medium and communicate the component information to the RF reader.

28. The system of claim 22, wherein both the RFID tag and the active label device respectively include first and second energy storage units operably connected to the display driver, and wherein the system is configured to provide electrical power to the display driver from at least one of the first and second energy storage units.

29. The system of claim 28, wherein the display driver is operably connected to an external power supply, and wherein the active label device is configured to power the display driver using one or more of the first and second energy storage units and the external power supply.

* * * * *